(12) United States Patent
Osabe et al.

(10) Patent No.: US 7,623,423 B2
(45) Date of Patent: Nov. 24, 2009

(54) APPARATUS AND METHOD FOR RECORDING DATA IN DIFFERENT FORMATS ON A MULTILAYER OPTICAL DISK, AND STORAGE MEDIUM HAVING A PROGRAM STORED THEREON TO ENABLE A COMPUTER TO PERFORM SUCH METHOD

(75) Inventors: Hisao Osabe, Kanagawa (JP); Masayuki Arai, Tokyo (JP)

(73) Assignee: Sony Corporation (JP)

( * ) Notice: Subject to any disclaimer, the term of this patent is extended or adjusted under 35 U.S.C. 154(b) by 532 days.

(21) Appl. No.: 11/439,604

(22) Filed: May 24, 2006

(65) Prior Publication Data

US 2006/0291347 A1    Dec. 28, 2006

(30) Foreign Application Priority Data

Jun. 22, 2005    (JP) ............................. 2005-181466

(51) Int. Cl.
  G11B 7/00    (2006.01)
  G11B 20/00    (2006.01)
(52) U.S. Cl. ............... 369/47.16; 369/47.19; 369/47.23
(58) Field of Classification Search .................. None
  See application file for complete search history.

(56) References Cited

U.S. PATENT DOCUMENTS

| | | | | |
|---|---|---|---|---|
| 4,389,681 | A * | 6/1983 | Tanaka et al. .................. | 360/27 |
| 5,315,570 | A * | 5/1994 | Miura et al. ............. | 369/47.24 |
| 6,069,868 | A | 5/2000 | Kashiwagi | |
| 7,433,294 | B2 * | 10/2008 | Lee ......................... | 369/275.1 |
| 2004/0202091 | A1 * | 10/2004 | Kando et al. ........... | 369/124.08 |
| 2005/0122890 | A1 * | 6/2005 | Ando et al. ............... | 369/275.4 |

FOREIGN PATENT DOCUMENTS

| | | |
|---|---|---|
| EP | 1017054 | 7/2000 |
| EP | 1424694 | 6/2004 |
| JP | 6-195882 A | 7/1994 |
| JP | 10-040574 A | 2/1998 |
| JP | 11-39710 A | 2/1999 |
| JP | 11126427 | 5/1999 |
| JP | 2000-215445 A | 8/2000 |
| JP | 2001-167515 A | 6/2001 |

(Continued)

OTHER PUBLICATIONS

European Search Report, EP 06 01 1938, dated Apr. 7, 2009.

*Primary Examiner*—Peter Vincent Agustin
(74) *Attorney, Agent, or Firm*—Lerner, David, Littenberg, Krumholz & Mentlik, LLP

(57) ABSTRACT

An information processing apparatus for executing a process of recording data on a multilayer optical disk. The information processing apparatus includes: an encoding unit for encoding data to be written; a modulation unit for modulating the encoded data to generate a plurality of modulated data blocks corresponding to different recording formats; a pickup for sequentially writing the modulated data blocks in the different recording formats to different layers of the optical disk; and a control unit for controlling the writing of the modulated data blocks in the different recording formats so that writing processing per unit of modulated data is completed within processing time per unit of data encoded by the encoding unit.

11 Claims, 7 Drawing Sheets

FOREIGN PATENT DOCUMENTS

| | | |
|---|---|---|
| JP | 2002-216391 A | 8/2002 |
| JP | 2003-30857 A | 1/2003 |
| JP | 2004-095005 A | 3/2004 |
| JP | 2004-127518 A | 4/2004 |
| JP | 2004-253117 A | 9/2004 |
| JP | 2005-078120 A | 3/2005 |
| KR | 20010095391 | 11/2001 |

* cited by examiner

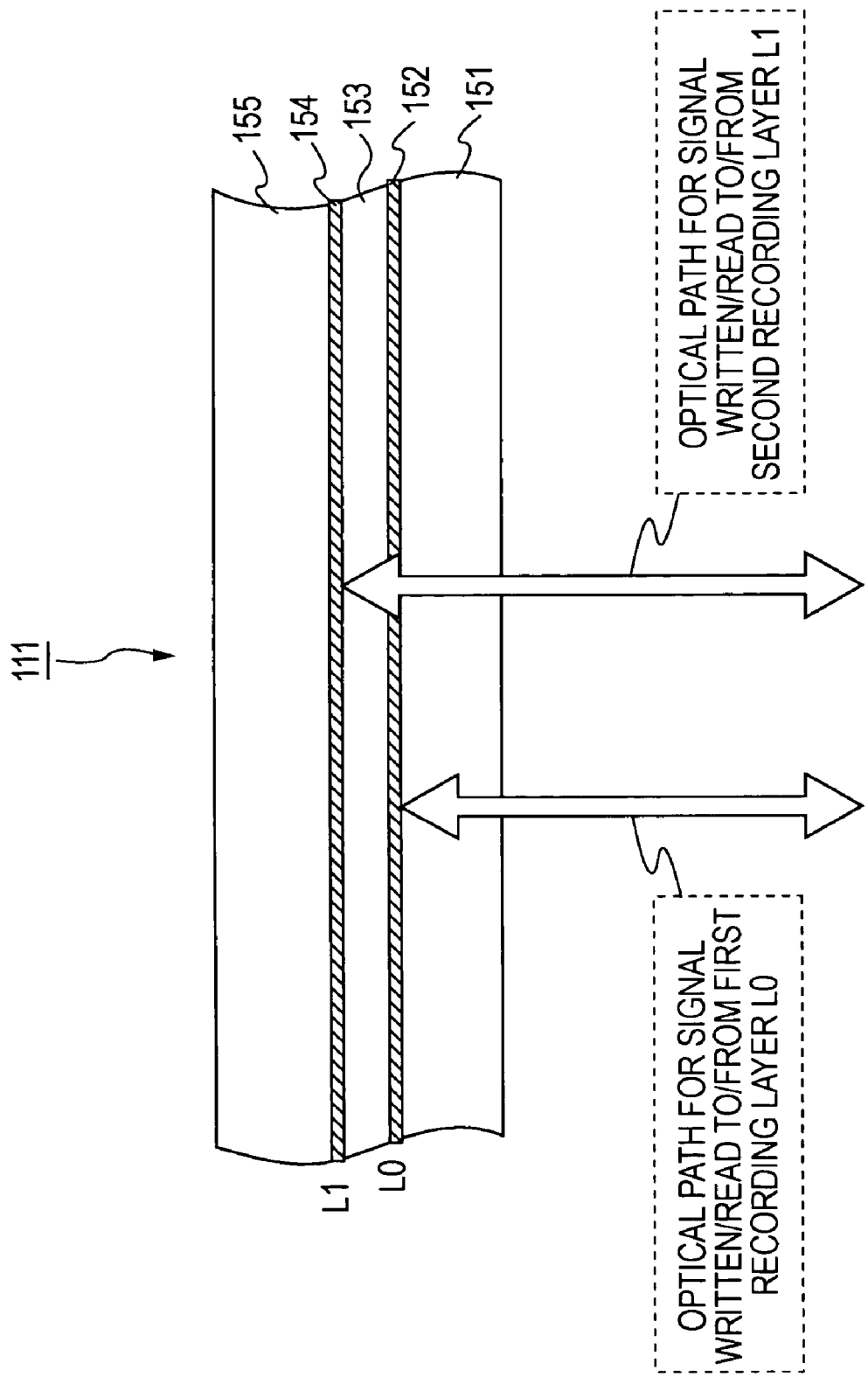

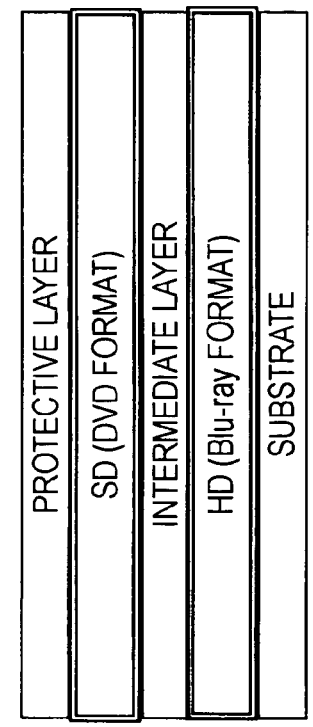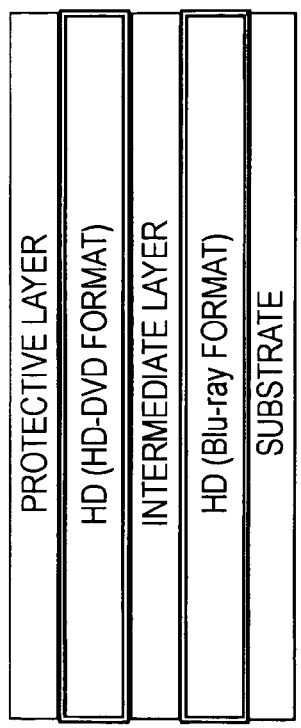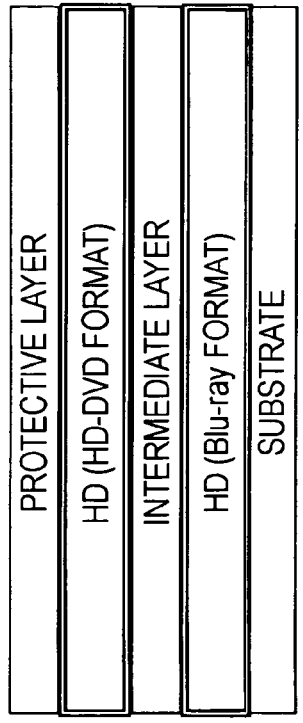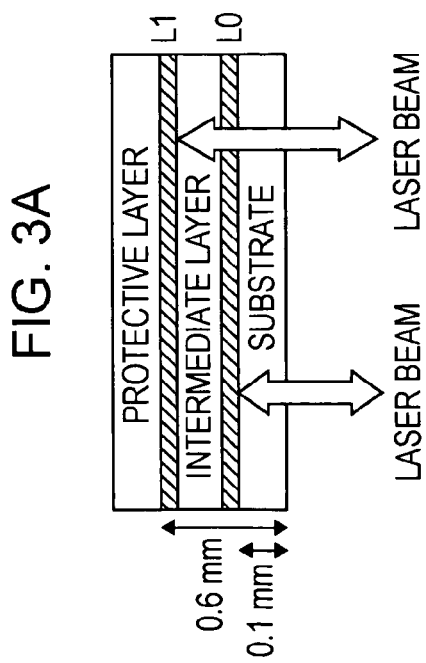

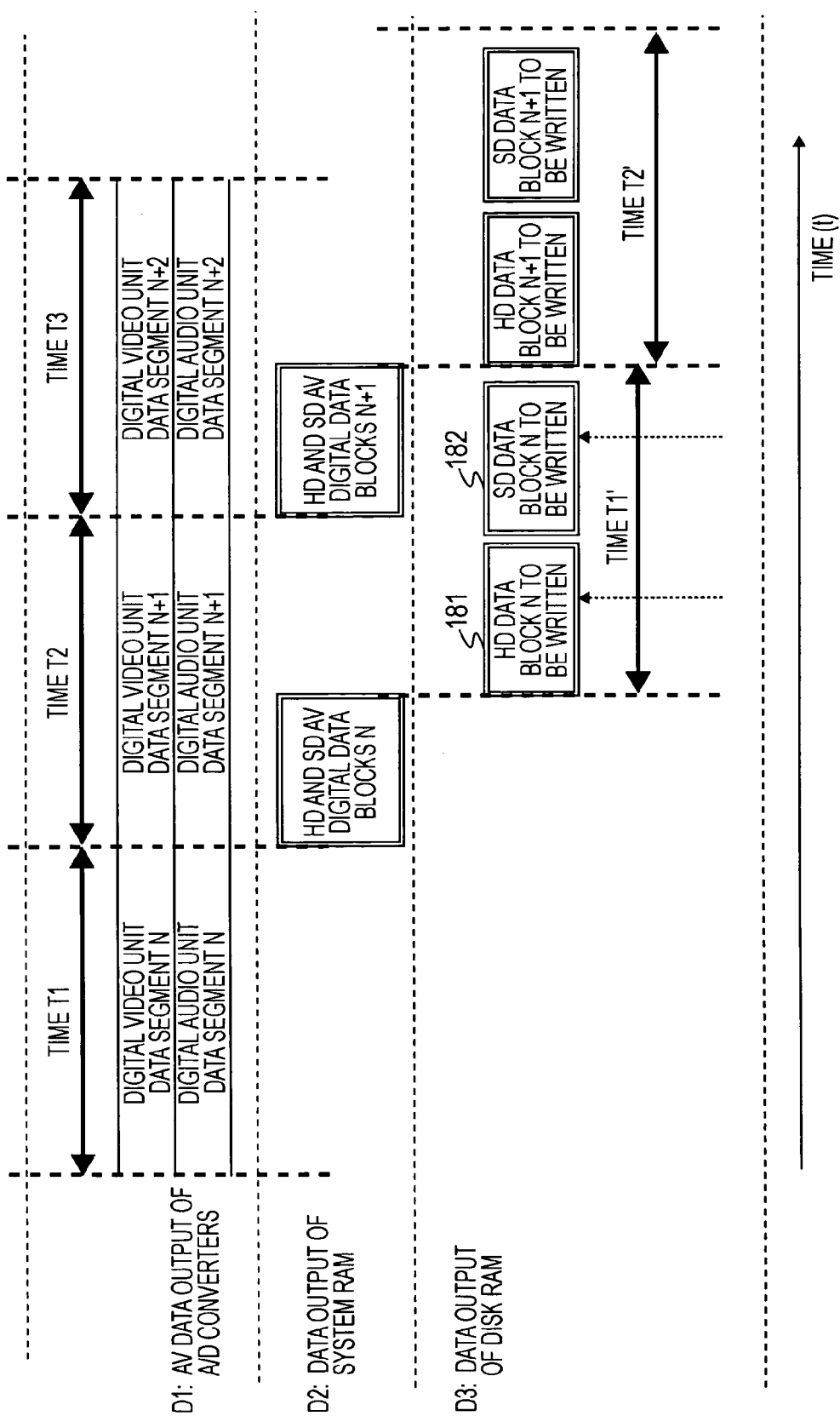

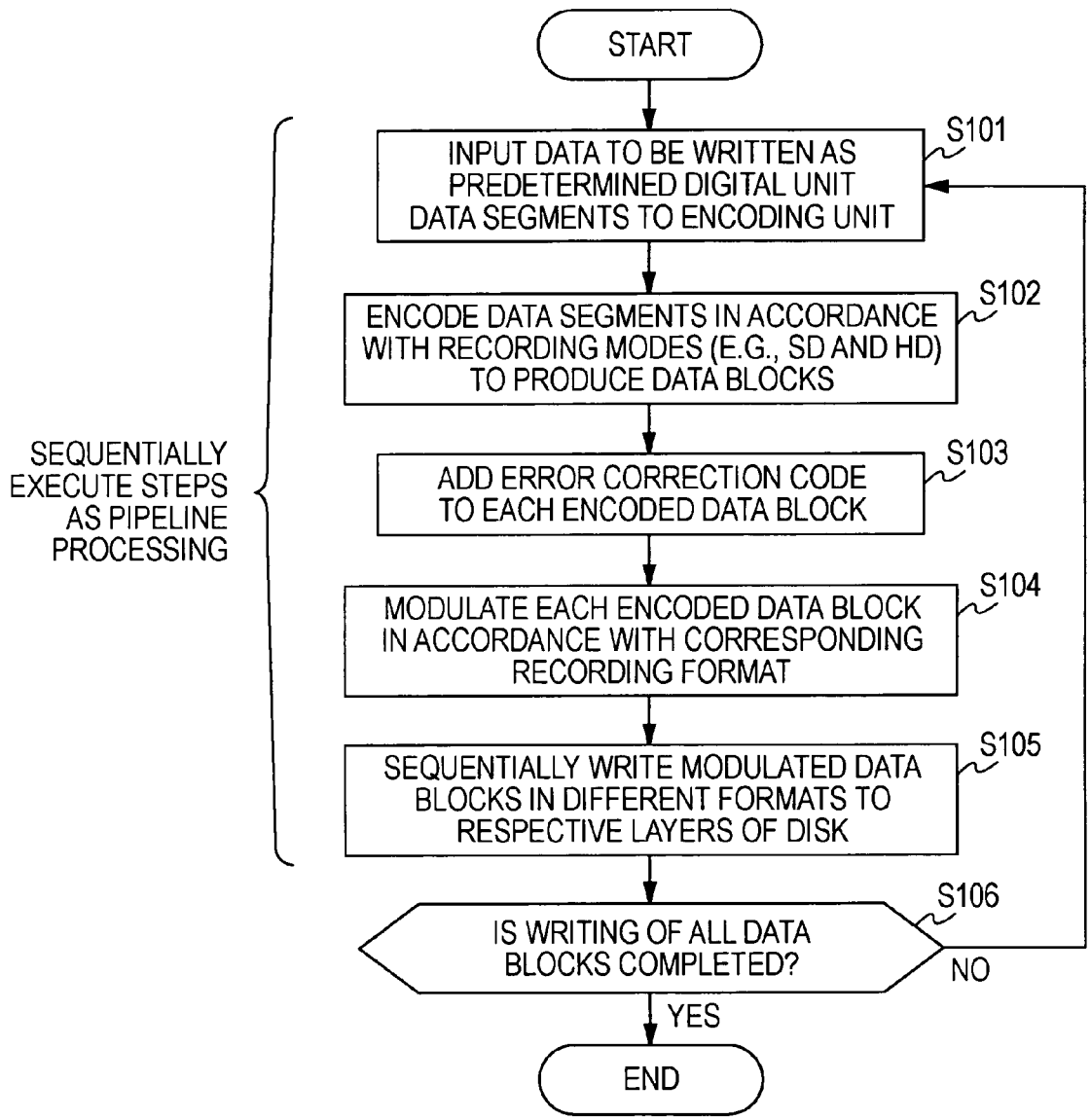

… (1)

APPARATUS AND METHOD FOR RECORDING DATA IN DIFFERENT FORMATS ON A MULTILAYER OPTICAL DISK, AND STORAGE MEDIUM HAVING A PROGRAM STORED THEREON TO ENABLE A COMPUTER TO PERFORM SUCH METHOD

CROSS-REFERENCE TO RELATED APPLICATIONS

The present application claims priority from Japanese Patent Application No. JP 2005-181466 filed on Jun. 22, 2005, the disclosure of which is hereby incorporated by reference herein.

BACKGROUND OF THE INVENTION

The present invention relates to information processing apparatuses and methods, and computer programs and, more particularly, to an information processing apparatus and method for recording data in different formats on a disk having a plurality of recording layers, and a computer program.

In recent years, many optical disks have been utilized as digital data recording/playback media. Such optical disks include, e.g., digital versatile disks (DVDs).

The DVDs have recently been further improved in capacity in order to record and play back high-definition (HD) images, serving as HD data. Specifically, e.g., Blu-ray discs using a blue laser beam have been developed. The Blu-ray discs use the shorter wavelength of a laser beam that allows the disc to record data at higher density. In addition, research is being conducted to develop multilayering of recording layers as another approach to realizing high-capacity disks. For example, the use of two recording layers in a disk remarkably increases the recording capacity of the disk.

Currently, there are different data recording formats for DVDs. The formats are broadly classified into three categories: a DVD format, a Blu-ray format, and an HD-DVD format.

The DVD format is used for recording and playback of many widespread DVD media. The Blu-ray format and the HD-DVD format, which are capable of performing high-density recording and playback using a blue laser having a shorter wavelength, are suitable for recording and playback of HD images, serving as HD data. Although HD data can be recorded on a disk using the DVD format, recordable time per disk is reduced. Data modulation processes, each of which is performed to generate data to be written to a disk, vary among those formats. As for playback of data, it is necessary to execute a data demodulation process adapted to the corresponding format. In other words, those formats are incompatible with each other.

For playback of respective pieces of content recorded in the above-described formats, therefore, it is necessary to perform processes suitable for playback sequences corresponding to the respective formats. For recording of data, a process according to a recording sequence depends on the recording format to be used.

Under the above-described circumstances that the different formats are available, it is necessary to provide a plurality of types of disks compliant with the respective formats every piece of content. A user selects and uses a disk according to the format compatible with their recording/playback apparatus.

Under the present circumstances that the penetration of the Blu-ray format and that of the HD-DVD format are not so high, many pieces of content are recorded in the conventional DVD format and are then distributed to users. In the future, however, many pieces of content would be recorded in the Blu-ray format and the HD-DVD format and be distributed to the users.

As for broadcasting content and content to be distributed to the users via the Internet, the share of HD image data content is gradually being increased. Therefore, a content recording process on the user side would be gradually shifted from the conventional DVD format to the Blu-ray format and the HD-DVD format.

In the present situation, however, most of recording/playback apparatuses possessed by the users are compatible with the DVD format. There are not so much users who have recording/playback apparatuses compatible with the Blu-ray format and the HD-DVD format. Unfortunately, therefore, a user having the apparatus compatible with the DVD format cannot play a piece of content recorded in the Blu-ray format or the HD-DVD format and a user having the apparatus compatible with the Blu-ray format or the HD-DVD format cannot play a piece of content recorded in the conventional DVD format.

One approach to solving the above-described problem is to realize a system capable of recording and playing back data in different formats. For example, Japanese Unexamined Patent Application Publication No. 2001-167515 discloses a hybrid disc having data recorded in different formats, i.e., CD and DVD formats and a playback apparatus therefor.

For example, when data sets corresponding to the same content to be recorded are generated in different formats, it is necessary to execute a plurality of recording processes in accordance with the respective formats. Disadvantageously, it takes much time to record the content.

SUMMARY OF THE INVENTION

The present invention is made in consideration of the above-described circumstances and it is desirable to provide an information processing apparatus and method capable of efficiently recording data in accordance with different formats, and a computer program.

According to an embodiment of the present invention, there is provided an information processing apparatus for executing a process of recording data on a multilayer optical disk, the apparatus including: an encoding unit for encoding data to be written; a modulation unit for modulating the encoded data to generate a plurality of modulated data blocks corresponding to different recording formats; a pickup for sequentially writing the modulated data blocks in the different recording formats to different layers of the optical disk; and a control unit for controlling the writing of the modulated data blocks in the different recording formats so that writing processing per unit of modulated data is completed within processing time per unit of data encoded by the encoding unit.

According to this embodiment, the encoding unit may have a structure for executing high-definition compliant encoding and standard-definition compliant encoding. The modulation unit may generate a modulated data block corresponding to a high-definition encoded data block and a modulated data block corresponding to a standard-definition encoded data block. The control unit may have a structure for controlling the sequential writing of the high-definition modulated data block and the standard-definition modulated data block to the different layers of the optical disk.

According to this embodiment, preferably, the modulation unit has a structure for executing processing of generating a plurality of modulated data blocks corresponding to at least two kinds of a DVD format, a Blu-ray format, and an HD-DVD format.

According to this embodiment, preferably, the information processing apparatus includes an error correction code circuit for adding an error correction code to the encoded data. The error correction code circuit has a structure for executing processing of adding an error correction code to each of encoded data blocks to be sequentially written to the different layers of the optical disk.

According to this embodiment, the control unit may have a structure for controlling pipeline processing including encoding, error correction code addition, modulation, and writing of data to be written.

According to another embodiment of the present invention, there is provided an information processing method for executing a process of recording data on a multilayer optical disk, the method including the steps of: (a) encoding data to be written; (b) modulating the encoded data to generate a plurality of modulated data blocks corresponding to different recording formats; (c) sequentially writing the modulated data blocks in the different recording formats to different layers of the optical disk; and (d) controlling the writing of the modulated data blocks in the different recording formats so that writing processing per unit of modulated data is completed within processing time per unit of data encoded in the step (a).

According to this embodiment, in the step (a), high-definition compliant encoding and standard-definition compliant encoding may be executed. In the step (b), a modulated data block corresponding to a high-definition encoded data block and a modulated data block corresponding to a standard-definition encoded data block may be generated. In the step (c), the sequential writing of the high-definition modulated data block and the standard-definition modulated data block to the different layers of the optical disk may be controlled.

According to this embodiment, preferably, in the step (b), processing of generating a plurality of modulated data blocks corresponding to at least two kinds of a DVD format, a Blu-ray format, and an HD-DVD format is executed.

According to this embodiment, preferably, the method further includes the step of: (e) adding an error correction code to the encoded data. In the step (e), processing of adding an error correction code to each of encoded data blocks to be sequentially written to the different layers of the optical disk is executed.

According to this embodiment, preferably, in the step (d), pipeline processing including encoding, error correction code addition, modulation, and writing of data to be written is controlled.

According to further another embodiment of the present invention, there is provided a computer program for allowing an information processing apparatus to execute a process of recording data on a multilayer optical disk, the program comprising the steps of: (a) encoding data to be written; (b) modulating the encoded data to generate a plurality of modulated data blocks corresponding to different recording formats; (c) sequentially writing the modulated data blocks in the different recording formats to different layers of the optical disk; and (d) controlling the writing of the modulated data blocks in the different recording formats so that writing processing per unit of modulated data is completed within processing time per unit of data encoded in the step (a).

The computer program according to this embodiment may be recorded on a computer-readable recording medium, such as a compact disk (CD), a flexible disk (FD), or a magneto-optical (MO) disk, and be provided to a computer system capable of executing various program codes. Alternatively, the program may be distributed to such a computer system through a communication medium, such as a network. Since the program is computer-readable, processing based on the program can be realized on the computer system.

Other features and advantages of the present invention will become more apparent from the following detailed description of preferred embodiments of the invention in conjunction with the accompanying drawings. In the present specification, the term "system" refers to the logical structure of an apparatus including a plurality of devices, which are not necessarily arranged in the same enclosure.

According to one embodiment of the present invention, in executing encoding of data to be written to a multilayer optical disk having a plurality of recording layers, generating of a plurality of modulated data blocks corresponding to different recording formats based on the encoded data, and writing of the modulated data blocks to the respective layers of the optical disk, the control unit controls the writing of the modulated data blocks in the different recording formats so that writing processing per unit of modulated data is completed within processing time per unit of data encoded by the encoding unit. Thus, data blocks corresponding to the different formats can be written to the respective layers of the optical disk without delay after data input. Advantageously, a plurality of data blocks can be written in accordance with different formats within processing time equal to that during which a data block in one format is written.

BRIEF DESCRIPTION OF THE DRAWINGS

FIG. 2 is a diagram explaining the structure of a multilayer disk;

FIGS. 3A to 3D are diagrams explaining the structure of a multilayer disk and examples of the format combinations of data recorded on an optical disk according to the embodiment;

FIG. 4 is a timing diagram showing timings of processing steps included in data recording processing on an optical disk according to the embodiment;

FIG. 7 is a flowchart explaining a processing sequence of recording data on the optical disk according to the embodiment.

DETAILED DESCRIPTION

Preferred embodiments of the present invention will now be described in detail with reference to the drawings.

Figure 1:
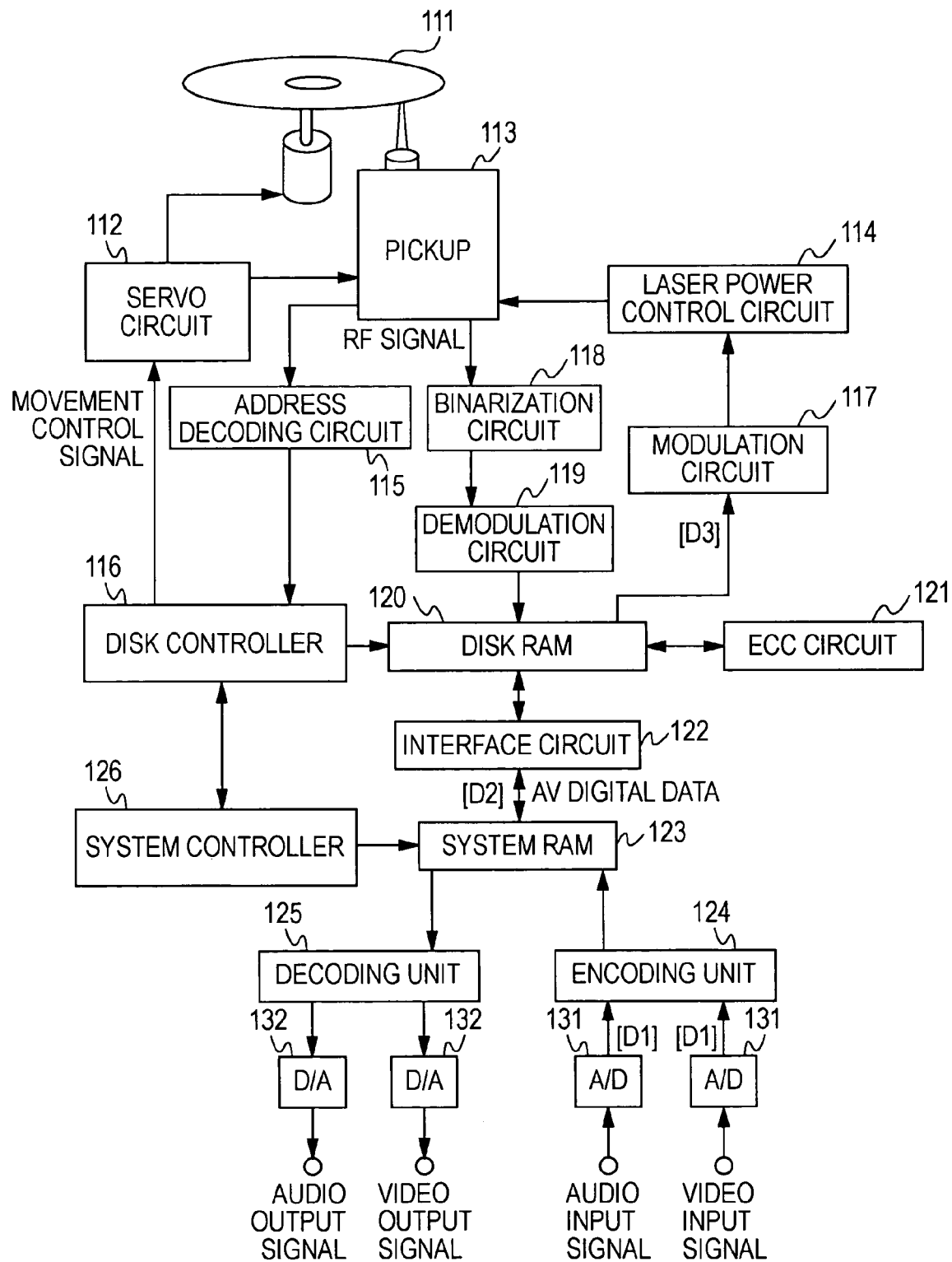
FIG. 1 is a diagram of the structure of an information processing apparatus according to an embodiment of the present invention.

FIG. 1 shows the structure of an information processing apparatus according to an embodiment of the present invention. Referring to FIG. 1, an optical disk 111 is a multiplayer type. The structure of the multilayer optical disk will now be described with reference to FIG. 2. Referring to FIG. 2, the optical disk 111 has two recording layers, i.e., a double-layered structure. A first recording layer (L0) 152 is formed on a substrate 151. A second recording layer (L1) 154 is overlaid on the first recording layer 152, with an intermediate layer 153 therebetween. A protective layer 155 is formed on the second recording layer 154. A laser beam emitted from a pickup enters the recording layer 152 or 154 through the substrate 151.

Again referring to FIG. 1, the structure of the information processing apparatus according to the present embodiment will now be described. The multilayer optical disk 111 shown in FIG. 2 is rotated so as to maintain a predetermined rotational speed under the control of a servo circuit 112. The servo circuit 112 controls a pickup 113 to perform writing or reading to/from the optical disk 111 in a predetermined position. A laser power control circuit 114 controls a laser output at a predetermined power level.

The pickup 113 reads out address information, recorded on the optical disk 111 by wobbling tracks, as a tracking signal and supplies the read signal to an address decoding circuit 115. The address decoding circuit 115 decodes address information recorded on the optical disk 111 and supplies the decoded information to a disk controller 116.

In order to control the pickup 113 to a desired position on the optical disk 111 on the basis of the decoded address information, the disk controller 116 generates a control signal based on the address information and supplies the control signal to the servo circuit 112. The servo circuit 112 controls the pickup 113 in accordance with the control signal based on the address information supplied from the disk controller 116, i.e., moves the pickup 113 to a desired position on the optical disk 111 and allows the pickup to write or read data.

Data recording by the information processing apparatus shown in FIG. 1 according to the present embodiment of the present invention will now be described in detail with reference to the drawings. In the information processing apparatus according to the present embodiment of the present invention, data blocks in different formats are recorded in parallel on the respective layers of the multilayer optical disk 111.

Combination examples of recording formats in the parallel recording by the information processing apparatus according to the present embodiment of the present invention will now be described with reference to FIGS. 3A to 3D. FIG. 3A is a sectional view of the structure of a double-layer optical disk explained with reference to FIG. 2. A first recording layer L0 overlies on a substrate. A second recording layer L1 overlies on the first recording layer, with an intermediate layer therebetween. A protective layer overlies on the second recording layer. A laser beam emitted from the pickup is incident on the recording layer L0 or L1 through the substrate.

For example, a distance from the surface of the substrate to the first recording layer L0 is set to 0.1 mm and a distance from the surface of the substrate to the second recording layer L1 is set to 0.6 mm. FIGS. 3B to 3D show combination examples of recording formats in the parallel recording by the information processing apparatus according to the present embodiment of the present invention. In FIGS. 3B to 3D, "HD" denotes high-definition (HD) data and "SD" indicates standard-definition (SD) data.

FIGS. 3B to 3D show combination examples of three kinds of formats. In other words, FIG. 3B shows the following combination:
HD data (Blu-ray format) in the first recording layer L0; and SD data (DVD format in the second recording layer L1.

FIG. 3C shows the following combination:
HD data (Blu-ray format) in the first recording layer L0; and HD data (HD-DVD format) in the second recording layer L1.

FIG. 3D shows the following combination:
HD data (Blu-ray format) in the first recording layer L0; and HD (DVD format) in the second recording layer L1.

According to the present embodiment of the present invention, the information processing apparatus is capable of recording data sets in the above-described different formats on the first and second recording layers L0 and L1, respectively, within processing time that is equal to normal processing time necessary to record a data set in one format.

An execution sequence of recording data sets in the two formats of FIG. 3B on an optical disk will now be described with reference to FIG. 4.

FIG. 4 is a timing diagram illustrating the transition of data segments [D1] and data blocks [D2] and [D3] output from components in FIG. 1 with respect to time. In FIG. 4, time (t) progresses from left to right.

As shown in FIG. 1, the data segments [D1] correspond to outputs of analog-to-digital (A/D) converters 131. The data block [D2] corresponds to an output of a system RAM 123. The data block [D3] corresponds to an output of a disk RAM 120.

In FIG. 4, each of time periods T1, T2, and T3 corresponds to a time period during which a predetermined unit of data to be processed is output from each of the A/D converters 131 and is then encoded by an encoding unit 124. The time periods T1 to T3 are equal to each other (T1=T2=T3).

Digital unit data N is associated with the time period T1, digital unit data N+1 is associated with the time period T2, and digital unit data N+2 is associated with the time period T3. In other words, during each time period, the associated unit data segments are output from the A/D converters 131 and are then encoded by the encoding unit 124. During each of the next time period T4 and subsequent time periods, the corresponding subsequent unit data segments are subjected to similar processing.

The time period T1=T2=T3 is set to a maximum length of time necessary for, e.g., encoding by the encoding unit 124. Processing control based on the timing diagram in FIG. 4 is realized by a control unit including the disk controller 116 and a system controller 126 shown in FIG. 1. Those controllers control pipeline processing including encoding, error correction code addition, modulation, and writing of data to be written, thereby realizing the processing in accordance with the timing diagram of FIG. 4.

Referring to FIG. 1, the A/D converters 131 receive audio and video analog signals, serving as data to be written to the optical disk 111, convert the analog signals into digital data segments, and then supply the digital data segments to the encoding unit 124.

Referring to FIG. 4, for example, a digital video unit data segment N and a digital audio unit data segment N are subjected to encoding involving information compression by the encoding unit 124. The encoding includes, e.g., MPEG compression.

According to the present embodiment of the present invention, as described above, the information processing apparatus records data sets in the two formats of the combination shown in FIG. 3B. In other words, the HD (Blu-ray format) data set is recorded on the first recording layer L0 and the SD (DVD format) data set is recorded on the second recording layer L1.

In order to record the above-described two kinds of data, i.e., HD data and SD data, the encoding unit 124 generates two kinds of encoded data blocks, i.e., an HD encoded data block which serves as a compressed data block corresponding to HD data and an SD encoded data block which serves as a compressed data block corresponding to SD data.

The structure of the encoding unit 124 used to record the two format data sets in the combination of formats in FIG. 3B and processing by the encoding unit 124 will now be described with reference to FIG. 5.

Figure 5:
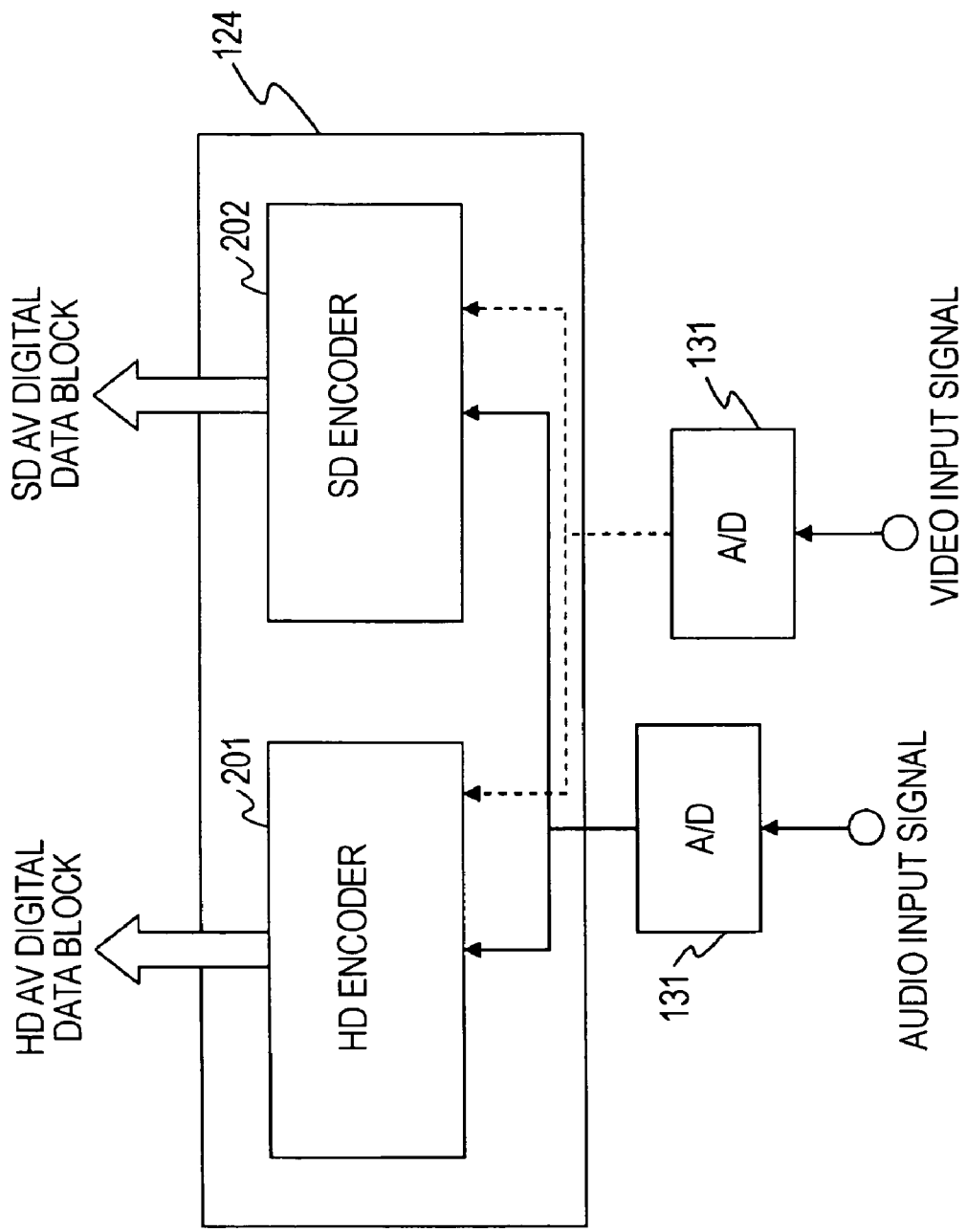
FIG. 5 is a diagram showing an example of the structure of an encoding unit in the information processing apparatus according to the embodiment.

Referring to FIG. 5, the encoding unit 124 includes an HD encoder 201 and an SD encoder 202. Audio and video digital data segments to be written to the optical disk 111 are supplied from the A/D converters 131 to the HD encoder 201 and the SD encoder 202. The HD encoder 201 executes HD-compliant encoding to the audio and video digital data segments, thereby generating an HD AV digital data block. The SD encoder 202 executes SD-compliant encoding to the audio and video digital data segments, thereby generating an SD AV digital data block. The system RAM 123, shown in FIG. 1, stores the HD and SD AV digital data blocks.

For example, during the time period T1 in FIG. 4, the encoding unit 124 executes the HD-compliant encoding and the SD-compliant encoding to the audio and video unit data segments N supplied from the A/D converters 131 to generate HD and SD AV digital unit data blocks and stores the encoded unit data blocks in the system RAM 123. During the next time period T2, the encoding unit 124 encodes the next audio and video unit data segments N+1. The encoding unit 124 sequentially encodes the audio and video unit data segments N+2, N+3, . . .

After the time period T1, the system RAM 123 outputs a pair of the encoded unit data blocks (i.e., the HD encoded unit data block and the SD encoded unit data block generated from the same audio and video unit data segments) N to the disk RAM 120 for the optical disk ill through an interface circuit 122 under the control of the system controller 126. This data output processing corresponds to data output [D2] of the system RAM in FIG. 4 and is shown in the first half of the time period T2.

As shown in FIG. 4, when completely receiving each of the pairs of the encoded unit data blocks N, N+1, N+2, . . . from the encoding unit 124, the system RAM 123 outputs the received pair of the encoded unit data blocks to the disk RAM 120.

An error correction code (ECC) circuit 121 adds an error correction code to each of the AV digital unit data blocks N stored in the disk RAM 120. The AV digital unit data blocks N, each of which the error correction code has been added to, are temporarily stored in the disk RAM 120. In other words, an error correction code is added to each of the HD encoded data block and the SD encoded data block. The two AV digital unit data blocks, i.e., the HD and SD AV digital data blocks N, each of which the error correction code has been added to, are temporarily stored in the disk RAM 120.

The disk controller 116 reads the two (HD and SD) AV digital unit data blocks N from the disk RAM 120 and executes writing of the data blocks to the respective recording layers of the multilayer optical disk 111. In other words, as shown in FIG. 3B, the disk controller 116 controls the writing of the HD AV digital unit data block in the Blu-ray format to the first layer L0 and the writing of the SD AV digital unit data block in the DVD format to the second layer L1.

Again referring to FIG. 4, the writing of the two unit data blocks in the two formats is completed within a time period T1' shown in a row for data output [D3] of the disk RAM. The time period T1' is equal to each of the time periods T1 to T3 shown in a row for audio and video data output of the A/D converters.

First, the disk controller 116 reads the HD unit data block N to be written from the disk RAM 120 and transfers the read data block to a modulation circuit 117. The modulation circuit 117 modulates the data block in accordance with the Blu-ray format for the first layer L0 of the optical disk 111 and supplies the modulated data to the laser power control circuit 114. The laser power control circuit 114 modulates laser output in accordance with the modulated data. After that, the modulated HD unit data block N is written to the first layer L0 of the optical disk 111 in accordance with the Blu-ray format. The data subjected to this writing processing corresponds to a data block 181 in FIG. 4.

Subsequently, the disk controller 116 reads the SD unit data block N to be written from the disk RAM 120 and transfers the read data block to the modulation circuit 117. The modulation circuit 117 modulates the data block in accordance with the DVD format for the second layer L1 of the optical disk 111 and supplies the modulated data to the laser power control circuit 114. The laser power control circuit 114 modulates laser output in accordance with the modulated data. After that, the modulated SD unit data block N is written to the second layer L1 of the optical disk 111 in accordance with the DVD format. The data subjected to this writing processing corresponds to a data block 182 in FIG. 4. In this manner, AV digital unit data blocks are sequentially written to the first and second layers, respectively.

Under the control of the disk controller 116, the above-described data writing processing is executed so as to be completed within the time period T1' shown in FIG. 4. The next unit data blocks N+1 are subjected to the similar processing within a time period T2', so that the HD data block and the SD data block are written in the different formats to the layers of the optical disk 111, respectively.

The pairs of the unit data blocks N, N+1, N+2, . . . are sequentially recorded in the two different formats on the two layers of the optical disk 111 by executing the above-described writing processing. Processing time for writing is set such that the writing time periods T1', T2', . . . are equal to the input time periods T1, T2, . . . during each of which audio and video unit data segments are supplied from the respective A/D converters 131. This means that data is written in the two different formats within processing time equal to that during which data is written normally in one format.

The control unit for controlling processing timing, i.e., the system controller 126 and the disk controller 116 control writing of modulated data blocks corresponding to different formats so that writing processing per unit of modulated data is completed within processing time per unit of data encoded by the encoding unit 124. Thus, data blocks can be written in the different formats to the respective layers of the optical disk without delay after data input. Advantageously, a plurality of data blocks can be recorded in accordance with different formats within the same processing time as that for recording a data block in one format.

The above-described processing example relates to the format combination shown in FIG. 3B. In other words, the combination of HD data in the Blu-ray format for the first layer L0 and SD data in the DVD format for the second layer L1 has been described. As for other format combinations, i.e., the combination of HD data in the Blu-ray format for the first layer L0 and HD data in the HD-DVD format for the second layer L1 shown in FIG. 3C and the combination of HD data in the Blu-ray format for the first layer L0 and HD data in the DVD format for the second layer L1 shown in FIG. 3D, a processing sequence for recording is executed at timing shown in FIG. 4.

The encoding unit 124 executes encoding in accordance with data and respective formats in each combination and the modulation circuit 117 executes modulation in accordance with the data and the respective formats.

Figure 6A:
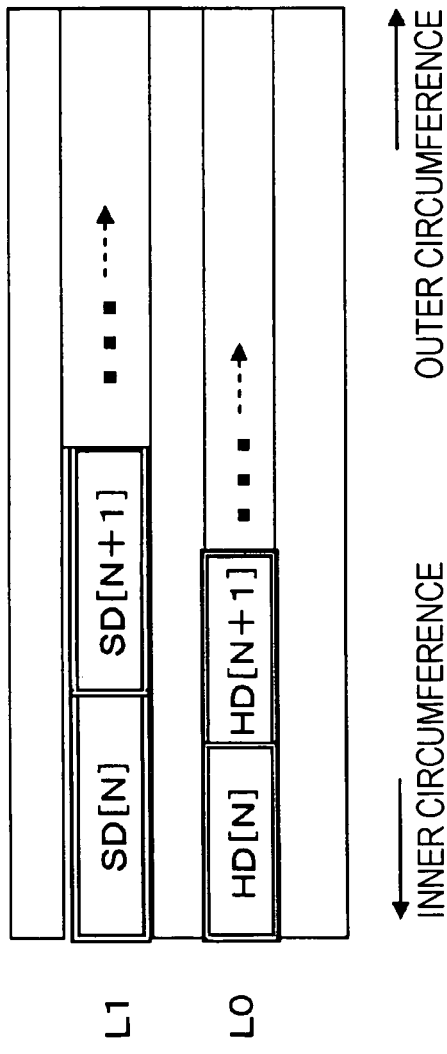
FIGS. 6A and 6B are diagrams showing setting examples of write positions in the data recording processing on the optical disk according to the embodiment.
Figure 6B:
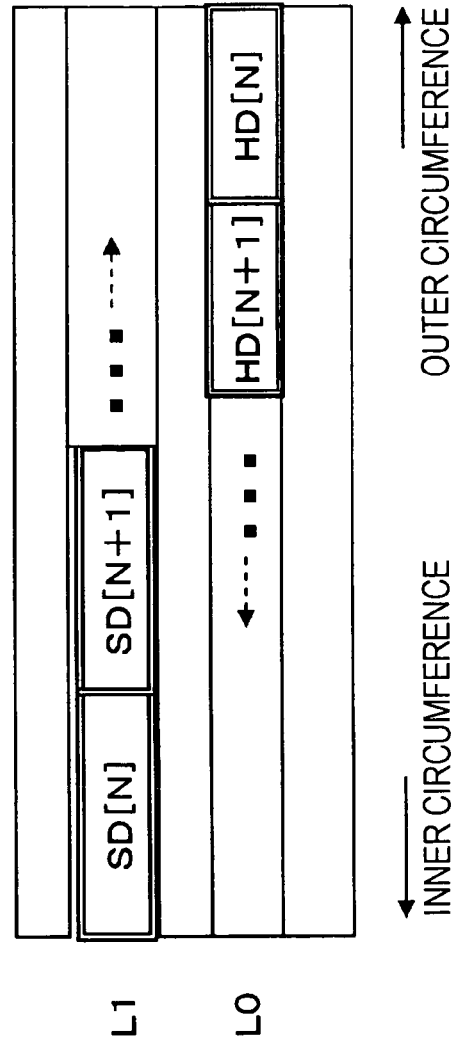

As for write positions of different format data blocks on the respective layers of the optical disk 111, various position settings are permitted as shown in FIGS. 6A and 6B. FIG. 6A shows a case where HD and SD data blocks to be written in different formats are sequentially recorded radially outwardly on the optical disk. FIG. 6B shows a case where HD and SD data blocks to be written in the different formats are sequentially recorded in such a manner that the SD data blocks are recorded radially outwardly and the HD data blocks are recorded radially inwardly. Other various write positions can be set. Two format data blocks produced from the same processing unit data segments have to be written within a predetermined processing time. It is, therefore, necessary to control writing of two format data blocks in consideration of seek time of the pickup so that the writing of the two data blocks is completed within the above-described processing time T1 (T1') in FIG. 4.

Reading of data written in different formats will now be described with reference to FIG. 1. In the reading, data written in either layer of the optical disk 111 is selected and is then read.

Before reading data from the optical disk 111, the servo circuit 112 first controls the pickup 113 to seek a position of written data to be read and focus on a layer where the data to be read has been written, so that the reading of predetermined written data is started.

It is assumed that the data to be read is the written data block N. A read signal of the pickup 113 is a light intensity signal called an RF signal. The RF signal is subjected to waveform shaping by a binarization circuit 118, i.e., the signal is converted into binary digital data of "0" and "1". After that, the binary data is supplied to a demodulation circuit 119. The binary data is demodulated, e.g., subjected to EFM plus demodulation by the demodulation circuit 119 in accordance with the format for the read data. The resultant data is stored in the disk RAM 120.

In addition, the data stored in the disk RAM 120 is subjected to error correction processing based on an error correction code by the ECC circuit 121. If the read data includes an error, the error is corrected. The corrected data is supplied from the disk RAM 120 to the system RAM 123 through the interface circuit 122.

Under the control of the system controller 126, the data stored in the system RAM 123 is supplied to a decoding unit 125. The supplied data is decoded in accordance with the encoding mode of the read data. For instance, when the read data is HD data, HD-compliant decoding is executed. When the read data is SD data, SD-compliant decoding is executed.

The decoded data is supplied to digital-to-analog (D/A) converters 132. In other words, audio and video digital data segments are converted into audio and video analog signals through the D/A converters 132. The audio and video signals are then output from the D/A converters 132 and are then played back.

In a conventional playback apparatus capable of playing only DVD format data, for example, SD data written in the DVD format in the second layer L1 can be read from a disk containing written data shown in FIG. 3B and be played. In the case of a data structure of FIG. 3D, HD data written in the DVD format in the second layer L1 can be read from a disk containing the written data in FIG. 3D and be played.

In a playback apparatus capable of playing HD-DVD format data, HD data written in the HD-DVD format in the second layer L1 can be read from, e.g., a disk containing written data shown in FIG. 3C and be played.

In a playback apparatus capable of playing Blu-ray format data, HD data written in the Blu-ray format in the first layer L0 can be read from any of disks containing written data shown in FIGS. 3B to 3D and be played.

An apparatus for recording/playing data in the DVD format and also recording/playing data in either the HD-DVD format or the Blu-ray format has to include a recording/playback pickup using laser beams having different wavelengths. An apparatus compatible with both of the HD-DVD format and the Blu-ray format may include a pickup using a blue wavelength laser.

A processing sequence of data recording executed by the information processing apparatus according to the present embodiment of the present invention will now be described with reference to a flowchart shown in FIG. 7. In step S101, data to be written is supplied as predetermined digital unit data segments to an encoding unit, which corresponds to the encoding unit 124 in FIG. 1 and includes an encoder for HD data and another encoder for SD data as shown in, e.g., FIG. 5.

In step S102, the encoding unit encodes the unit data segments in accordance with recording modes. In recording, e.g., SD data and HD data, the encoding unit executes SD-compliant encoding and HD-compliant encoding to produce SD and HD encoded data blocks.

In step S103, the encoded data blocks are subjected to error correction code addition. The ECC circuit 121 executes this processing to data stored in the disk RAM shown in FIG. 1.

In step S104, the encoded data blocks are modulated in accordance with the recording formats. Modulation depends on the recording format in each layer of an optical disk. Modulation is executed in accordance with any of the DVD format, the HD-DVD format, and the Blu-ray format. This modulation processing is executed by the modulation circuit 117 in FIG. 1.

In step S105, a plurality of modulated data blocks compliant with different formats are sequentially written to the respective layers of the disk. The pickup 113 executes this processing, i.e., writes data to the optical disk 111 on the basis of the modulated data blocks sequentially output from the modulation circuit 117 in FIG. 1. As described above with reference to FIGS. 6A and 6B, various data write positions can be set. The pickup 113 writes data to the respective layers while performing a seeking process on the basis of write positions.

In step S106, it is determined whether writing of all data blocks is completed. If NO, steps S101 to S105 are repeated. Steps S101 to S105 are sequentially executed in parallel as pipeline processing in accordance with timings described above with reference to FIG. 4. Advantageously, data blocks can be written in different formats to respective layers of the optical disk without delay after data input.

As described above, the control unit, including the system controller 126 and the disk controller 116 in FIG. 1, controls the pipeline processing including encoding, error correction code addition, modulation, and writing of data to be written to achieve the processing in accordance with the timing diagram of FIG. 4. The control unit for controlling processing timing controls writing of modulated data blocks in different recording formats so that writing processing per unit of modulated data is completed within processing time per unit of data encoded by the encoding unit. Thus, data blocks corresponding to different formats can be written to respective layers of an optical disk without delay after data input. Advantageously, a plurality of data blocks can be written in accordance with different formats within processing time equal to that during which a data block in one format is written.

Having described the preferred embodiment of the present invention with referring to the accompanying drawings, it should be understood that the present invention is not limited to the embodiment and various modifications and alternations thereof could be made by one skilled in the art without departing from the scope of the appended claims or the equivalents thereof. While the described embodiment represents the preferred form of the present invention, it will be appreciated that the invention is not limited thereto. The scope of the present invention is therefore to be determined solely by the appended claims.

A series of processing steps described above may be implemented by hardware, software, or the combination thereof. When the steps are executed by software, a program constituting the software including a processing sequence may be installed on a memory of a computer incorporated in dedicated hardware or a general-purpose computer capable of executing various processes.

For example, the program may be recorded on a hard disk or a read only memory (ROM), serving as a recording medium. Alternatively, the program may be temporarily or permanently stored (recorded) on a removable recording medium, e.g., a flexible disk, a compact disk read only memory (CD-ROM), a magneto-optical (MO) disk, a digital versatile disk (DVD), a magnetic disk, or a semiconductor memory. Such a removable recording medium can be provided as package software.

In addition to the install of the program from the above-described removable recording medium to the computer, the program may be transferred from a download site to the computer by wireless, or may be transferred to the computer by wire through a network, e.g., a local area network (LAN) or the Internet. In the computer, the transferred program can be received and be installed on a recording medium, such as an integral hard disk.

As for various processing steps described in this specification, the steps may performed in time series in the described order, or may be performed in parallel or individually depending on the throughput of an apparatus which executes the steps, or as necessary.

The invention claimed is:

1. An information processing apparatus for executing a process of recording data on a multilayer optical disk, the apparatus comprising:
   an encoding unit for encoding data to be written;
   a modulation unit for modulating the encoded data to generate a plurality of modulated data blocks corresponding to different recording formats;
   a pickup for sequentially writing the modulated data blocks in the different recording formats to different layers of the optical disk; and
   a control unit for controlling the writing of the modulated data blocks in the different recording formats so that writing processing per unit of modulated data is completed within processing time per unit of data encoded by the encoding unit.

2. The apparatus according to claim 1, wherein
   the encoding unit has a structure for executing high-definition compliant encoding and standard-definition compliant encoding,
   the modulation unit generates a modulated data block corresponding to a high-definition encoded data block and a modulated data block corresponding to a standard-definition encoded data block, and
   the control unit has a structure for controlling the sequential writing of the high-definition modulated data block and the standard-definition modulated data block to the different layers of the optical disk.

3. The apparatus according to claim 1, wherein the modulation unit has a structure for executing processing of generating a plurality of modulated data blocks corresponding to at least two kinds of a DVD format, a Blu-ray format, and an HD-DVD format.

4. The apparatus according to claim 1, further comprising:
   an error correction code circuit for adding an error correction code to the encoded data, wherein
   the error correction code circuit has a structure for executing processing of adding an error correction code to each of encoded data blocks to be sequentially written to the different layers of the optical disk.

5. The apparatus according to claim 1, wherein the control unit has a structure for controlling pipeline processing including encoding, error correction code addition, modulation, and writing of data to be written.

6. An information processing method for executing a process of recording data on a multilayer optical disk, the method comprising the steps of:
   (a) encoding data to be written;
   (b) modulating the encoded data to generate a plurality of modulated data blocks corresponding to different recording formats;
   (c) sequentially writing the modulated data blocks in the different recording formats to different layers of the optical disk; and
   (d) controlling the writing of the modulated data blocks in the different recording formats so that writing processing per unit of modulated data is completed within processing time per unit of data encoded in the step (a).

7. The method according to claim 6, wherein
   in the step (a), high-definition compliant encoding and standard-definition compliant encoding are executed,
   in the step (b), a modulated data block corresponding to a high-definition encoded data block and a modulated data block corresponding to a standard-definition encoded data block are generated, and
   in the step (c), the sequential writing of the high-definition modulated data block and the standard-definition modulated data block to the different layers of the optical disk is controlled.

8. The method according to claim 6, wherein in the step (b), processing of generating a plurality of modulated data blocks corresponding to at least two kinds of a DVD format, a Blu-ray format, and an HD-DVD format is executed.

9. The method according to claim 6, further comprising the step of:
   (e) adding an error correction code to the encoded data, wherein
   in the step (e), processing of adding an error correction code to each of encoded data blocks to be sequentially written to the different layers of the optical disk is executed.

10. The method according to claim 6, wherein in the step (d), pipeline processing including encoding, error correction code addition, modulation, and writing of data to be written is controlled.

11. A computer memory device having stored thereon a computer program for allowing an information processing apparatus to execute a process of recording data on a multilayer optical disk, the program comprising the steps of:
    (a) encoding data to be written;
    (b) modulating the encoded data to generate a plurality of modulated data blocks corresponding to different recording formats;
    (c) sequentially writing the modulated data blocks in the different recording formats to different layers of the optical disk; and
    (d) controlling the writing of the modulated data blocks in the different recording formats so that writing processing per unit of modulated data is completed within processing time per unit of data encoded in the step (a).

* * * * *